United States Patent
Verwoerd

(10) Patent No.: US 10,084,747 B2
(45) Date of Patent: Sep. 25, 2018

(54) EXTERNAL ADDRESS SPACE COMPRESSION

(71) Applicants: Allied Telesis Holdings Kabushiki Kaisha, Tokyo (JP); ALLIED TELESIS, INC., Bothell, WA (US)

(72) Inventor: Theuns Willem Verwoerd, Christchurch (NZ)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 640 days.

(21) Appl. No.: 14/464,645

(22) Filed: Aug. 20, 2014

(65) Prior Publication Data
US 2015/0134853 A1    May 14, 2015

Related U.S. Application Data

(60) Provisional application No. 61/903,883, filed on Nov. 13, 2013.

(51) Int. Cl.
*G06F 15/16* (2006.01)
*H04L 29/12* (2006.01)

(52) U.S. Cl.
CPC ...... *H04L 61/2514* (2013.01); *H04L 61/1511* (2013.01); *H04L 61/10* (2013.01); *H04L 61/106* (2013.01); *H04L 61/25* (2013.01); *H04L 61/2535* (2013.01); *H04L 61/6068* (2013.01)

(58) Field of Classification Search
None
See application file for complete search history.

(56) References Cited

U.S. PATENT DOCUMENTS

| | | | | |
|---|---|---|---|---|
| 6,128,664 A * | 10/2000 | Yanagidate | ......... | H04L 61/2514 709/228 |
| 7,154,891 B1 * | 12/2006 | Callon | ................ | H04L 61/2514 370/392 |
| 2004/0177136 A1 * | 9/2004 | Chen | ................... | H04L 12/4625 709/223 |

FOREIGN PATENT DOCUMENTS

CN    102170380    8/2011

OTHER PUBLICATIONS

Azinger, M., L. Vegoda, "Issues Associated with Designating Additional Private IPv4 Address Space", RFC 6319, IETF, Jul. 2011.*
Y. Rekhter et al, "RFC 1918—Address Allocation for Private Internets", tools.ietf.org/html/rfc1918, (accessed Aug. 20, 2014).
Rekhter, Yakov et al., "Address Allocation for Private Internets", Network Working Group, Request for Comments: 1918, Obsoletes: 1627, 1597, BCP: 5, Category: Best Current Practice, http://tools.ietf.org/html/rfc1918, Feb. 1996, 9 pages.

* cited by examiner

*Primary Examiner* — Nam T Tran
(74) *Attorney, Agent, or Firm* — Brooks Acordia IP Law, PC; Michael Zarrabian

(57) ABSTRACT

Systems, apparatus and methods described herein are configured to allow use of network addresses in an internal or private network that are outside of private address ranges as specified by communication protocols (e.g., IPv4). In some embodiments, the systems, apparatus and methods described herein are further configured for use of placeholder addresses to facilitate communication with external computing devices that may have network addresses that overlap the local address space.

21 Claims, 14 Drawing Sheets

EXTERNAL ADDRESS SPACE COMPRESSION

RELATED U.S. CASES

This application claims the benefit and priority to U.S. Provisional Patent Application No. 61/903,883, entitled "NETWORK COMMUNICATIONS", filed Nov. 13, 2013, which is herein incorporated by reference.

BACKGROUND

Internet Protocol version 4 (IPv4) is one addressing methodology used to route traffic across the Internet. Communication protocols may use respective identifiers assigned to each device on the communication network. The number of identifiers may be limited to certain range. For example, Internet Protocol version 4 (IPv4) uses a 32-bit address space for identifiers for devices on a communications network.

Unfortunately, the use of a limited number of identifiers means that exhaustion of identifiers can occur, which creates a variety of problems. IPv4 has a theoretical limit of approximately 4 billion unique addresses. Of these, 17,891,328 addresses (or approximately 0.4% of unique IP address under IPv4) (RFC 1918) are reserved for use in private network addressing. The remaining addresses are allocated to publicly-accessible devices such as devices on the Internet. The reason for this allocation of network addresses is to avoid address conflicts between devices on the Internet and devices in a private network.

With the rapidly increasing use of Internet connected devices and mobile devices including smartphones and tablets, the number of addresses allocated for private network addressing is becoming insufficient. For example, large service providers may exhaust the number of available private network IP addresses.

SUMMARY

A need has arisen for a solution to that allows use of identifiers on private networks outside the identifier ranges allocated for use in private network addressing. Embodiments allow internal use of substantially the complete IPv4 address range. Embodiments are able to provide addressing that is transparent to external hosts and largely transparent to internal devices. For example, addresses of external hosts may be concealed from internal devices to avoid address conflicts. Embodiments are configured to compress or substitute the global IPv4 address range into a smaller, placeholder range in a local network scope thereby allowing use of substantially all of the IPv4 address range (except for the placeholder range) in an internal or private network without risk of local/global addressing conflicts. Embodiments may map external global address ranges to a smaller local-scope placeholder range. Embodiments may be supported by Network Address Translation (NAT)-based border translation. In some embodiments, NAT and Domain Name System (DNS) technologies are extended to support using substantially the complete IPv4 address range (except for a placeholder range) within an internal network.

An embodiment is directed to a method for processing a name resolution request. The method includes receiving, at an electronic system, a request to resolve a symbolic name associated with a network address of a computing device and determining a local network address associated with the computing device. The local network address may be in an allocated local network address range associated with an external network address space. In some embodiments, the request to resolve the symbolic name associated with the computing device is received from another computing device with a network address outside of a private Internet Protocol version 4 (IPv4) address range. In some embodiments, the request to resolve the symbolic name associated with the network address of the computing device is received at a Domain Name System (DNS) device. In some embodiments, the network address associated with the computing device is a global network address. In some embodiments, the local network address associated with the computing device is outside of a private network address range. In some embodiments, the external network address space is an Internet Protocol version 4 (IPv4) address space and the local network address is outside of a private IPv4 address range.

The method further includes determining a mapping of the local network address and the network address associated with the computing device and sending the mapping of the local network address and the network address associated with the computing device. In some embodiments, the sending comprises sending the mapping of the local network address and the network address associated with the computing device to a network device. In some embodiments, the network device is a gateway device.

Another embodiment is directed to a method for processing a communication request. The method includes receiving, at a port of an electronic system, a mapping of a local network address and a network address associated with a computing device and receiving a request comprising the local network address. The local network address is in an allocated local network address range associated with a global network address space. The method may further include modifying the request for the local network address with an external interface network address. In some embodiments, the mapping of the local network address and the network address associated with the computing device is received from a DNS device. In some embodiments, the electronic system is a network device. In some embodiments, the network device is configured for routing of a data packet. In some embodiments, the local network address is outside of a private Internet Protocol version 4 (IPv4) address range. In some embodiments, the network address associated with the computing device is within a global IPv4 address space.

The method further includes sending the request to the network address associated with the computing device based on the mapping of the local network address and the network address associated with the computing device and receiving a response from the computing device. The method further includes modifying the response with the local network address based on the mapping of the local network address and the network address associated with the computing device and sending the modified response.

Another embodiment is directed to a system for name resolution and mapping. The system includes a name resolution module configured for processing of a request to resolve a symbolic name associated with a network address of a computing device and a mapping module configured for determining a mapping of a local network address associated with the computing device and an external network address associated with the computing device based on the symbolic name. The system may further include a translation module configured to process requests based on the mapping determined by the mapping module. In some embodiments, the local network address is outside a private Internet Protocol version 4 IPv4 address range. In some embodiments, the network address of the computing device is in a global IPv4 address space.

In some embodiments, the system may further include a proxy module configured to process a request from a local address space outside of a private IPv4 address space for an IPv4 address space. In some embodiments, the system may further include a peer-to-peer module configured to process a request from a first local address space outside of a private IPv4 address space for a second local address space outside of a private IPv4 address space.

Another embodiment is directed to a method for establishing a communications link. The method includes sending a communication from a first device to an address resolution and mapping system requesting an address for a second device. In some embodiments, the address resolution and mapping system is configured to establish a communications link between the first device addressable within a first network and a second device addressable within a second network. In some embodiments, the first network and the second network are communicatively linked by the address resolution and mapping system that is addressable within the first network and addressable within the second network. The method further includes resolving with the address resolution and mapping system an address in the second network for the second device and allocating with the address resolution and mapping system a first mappable address within the first network. The method further includes responding with the address resolution and mapping system to the first device with the first mappable address and creating with the address resolution and mapping system a first mapping between the first mappable address and the resolved address. The method further includes allocating with the address resolution and mapping system a second mappable address within the second network and creating with the address resolution and mapping system a second mapping between the second mappable address and an address of the first device in the first network. In some embodiments, communications on the first network from the first device to the second device are addressed from the address of the first device to the first mappable address. In some embodiments, communications on the second network from the second device to the first device are addressed from an address of the second device to the second mappable address.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

DETAILED DESCRIPTION

Figure 1A:
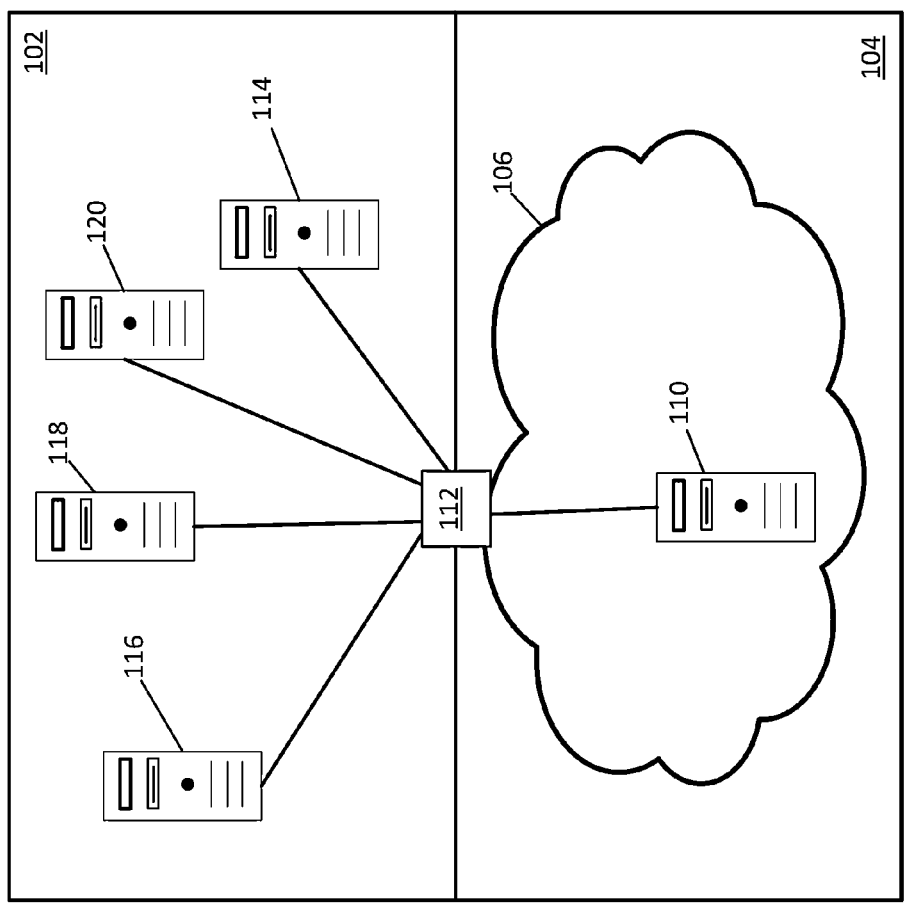
FIG. 1A shows an exemplary operating environment in accordance with some embodiments.

Reference will now be made in detail to various embodiments, examples of which are illustrated in the accompanying drawings. While the claimed embodiments will be described in conjunction with various embodiments, it will be understood that these various embodiments are not intended to limit the scope of the embodiments. On the contrary, the claimed embodiments are intended to cover alternatives, modifications, and equivalents, which may be included within the scope of the appended Claims. Furthermore, in the following detailed description of various embodiments, numerous specific details are set forth in order to provide a thorough understanding of the claimed embodiments. However, it will be evident to one of ordinary skill in the art that the claimed embodiments may be practiced without these specific details. In other instances, well known methods, procedures, components, and circuits have not been described in detail as not to unnecessarily obscure aspects of the claimed embodiments.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "converting," "transmitting," "storing," "determining," "sending," "querying," "providing," "accessing," "associating," "configuring," "initiating," "customizing", "mapping," "modifying," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

A need has arisen for a solution that allows use of identifiers associated with a device on private networks outside the identifier ranges allocated for use in private network addressing. Further, there is a need to allow communications between external networks and private networks with networks addresses outside of the private address ranges. For example, the private address ranges may be part of the Internet Protocol version 4 (IPv4) as specified in RFC 1918 (Available from http://tools.ietf.org/html/rfc1918).

One such solution to the limited number of internal network addresses is to use IP version 6 (IPv6), which uses a 128-bit address, allowing $2^{128}$, or approximately $3.4 \times 10^{38}$ addresses. However, most devices on the Internet are designed around IPv4 addressing and IPv6 devices typically have higher costs. Thus, there is substantial cost and therefore reluctance in migrating devices to IPv6.

Embodiments allow internal use of substantially the complete IPv4 address range. Embodiments are able to provide addressing that is transparent to external hosts and largely transparent to internal devices. For example, addresses of external hosts may be concealed from internal devices to avoid address conflicts. Embodiments may be configured to compress or substitute the global IPv4 address range into a smaller placeholder range in a local network scope thereby allowing substantially all of the IPv4 address range (except for the placeholder range) to be used in an internal or private network without risk of local/global addressing conflicts. Embodiments may map external global address ranges to a smaller local-scope placeholder range. Embodiments may be supported by NAT-based border translation. In some embodiments, NAT and DNS technologies are extended to support using substantially the complete IPv4 address range (except for a placeholder range) within an internal network.

It is noted that the global IPv4 address space is sparsely populated by servers and may be accessed primarily via symbolic DNS names. Embodiments may thus optimize the use of addresses by mapping the server population into a smaller IPv4 network range within a particular network scope (e.g., private network address scope, internal network address scope, etc.), freeing up the remainder of the IPv4 address space for other uses.

Embodiments may be configured for increasing the useable address space for internal networks (e.g., internal networks based on IPv4). The IPv4 address space is allocated between a publicly addressable space and a privately addressable space, which prevents conflicts by assigning different IP addresses to private devices and public devices. Embodiments provide isolation between the private and public address spaces thereby allowing substantially the entire address range to be utilized in a private network.

In some embodiments, devices within private networks can be assigned addresses from the substantially complete address range (e.g., of IPv4). Devices are thereby not limited to the reserved addresses supplied for private use (e.g., as described in IPv4 in RFC 1918). Embodiments enable addresses used in a private network to be the same as addresses used outside the private network without conflicts thereby increasing the number of available internal network addresses, which are independent of the external address range.

The use of an internal placeholder allows multiple network instances to be used. For example, a first network may use substantially all of the IPv4 address range and a second network within the first network may also use substantially all of the IPv4 addresses without conflict between the first network, the second network, and the IPv4 addresses used on the Internet. Embodiments are thus able to scale to the number of addresses needed based on multiple instances of the address space (e.g., multiple IPv4 address spaces).

Embodiments allow the use of NAT in conjunction with internal networks that support use of substantially all of the available address range while still allowing communication with external networks that use the same set of available addresses. For example, substantially all of the IPv4 address range, including addresses outside of the allocated private address ranges, may be used for internal network addressing.

The examples below are described with respect to IPv4. It should be understood, however, that the embodiments disclosed are not limited to IPv4. For example, embodiments may be implemented on any network in which devices are individually addressed by way of one or more addresses. Some of the examples below are described with two or three networks, which are exemplary and not intended to limit the scope. For example, more complex systems including four or more networks may be considered.

FIG. 1A shows an exemplary operating environment in accordance with some embodiments. The exemplary operating environment 100 includes an external address space 102, a private address space 104, a client 110, a network device 112, a name resolution device 114, and an Internet server 116. In some embodiments, the exemplary operating environment 100 may include an optional computing device 118 (e.g., an Internet server, service provider, cloud device, etc.) and an optional name resolution device 120. The client 110 is coupled to a network device 112 via a network 106. The Internet server 116, computing device 118, name resolution device 114, and name resolution device 120 are coupled to the network device 112. It is appreciated that any number of computing devices (e.g., client 110, servers 116-118, etc.), name resolution devices, network devices, etc., may be a part of an exemplary operating environment 100.

Before proceeding to further describe the various components of an operating environment 100, it is appreciated that the devices 110, 112, 114, 116, 118, and 120 are exemplary and are not intended to limit the scope of the embodiments. For example, an operating environment 100 may include other devices, such as workstations, modems, printers, bridges, hubs, voice over internet protocol (IP) telephones, IP video cameras, computer hosts, etc.

The client 110 may be any of a variety of computing devices including, but not limited to, computers, servers, desktop computers, laptops, tablets, mobile devices, smartphones, printers, fax machines, etc. The server 116 may be any of a variety of computing devices including, but not limited to, computers, servers, desktop computers, laptops, tablets, mobile devices, smartphones, printers, fax machines, etc.

The client 110 may send communication requests to a network device 112 for communication with devices in the external address space 102. In some embodiments, the external address space 102 is a global address space. The client 110 may have a network address that is allocated via direct allocation, static allocation, Dynamic Host Configuration Protocol (DHCP), etc.

A network device 112 may be a hub, a switch, a gateway, a router, a wireless router, a wireless access point, etc. The network device 112 may be operable to perform NAT. For example, the network device 112 may translate an address in a communication request from a client 110 for communication of the request to a server 116 and the network device 112 may further translate an address of a response to the request for communication from an Internet server 116 to the client 110. The network device 112 may have one or more interfaces that are addressable in each of a first network (e.g., a private network, an internal network, etc.) and a second network (e.g., a public network, the Internet, etc.).

A name resolution device 114 may be configured to translate a name into a network address. For example, the name resolution device 114 may translate symbolic names, including domain names. A symbolic name may be a label associated with a service, entity, device, etc., that can be mapped to an IP address. The symbolic name may be a human-readable identifier such as the domain portion of a Uniform Resource Locator (URL) comprising a domain name. In some embodiments, the name resolution device 114 may comprise a cache configured for use in translating a symbolic name. The name resolution device 114 may use any protocol that uses symbolic names to locate services, network addresses, etc.

In some embodiments, the name resolution device 114 is a DNS server. For example, a client 110 may send a DNS lookup request to a name resolution device 114 to translate the symbolic name "www.google.com" to an IP address. In some embodiments, the name resolution device 114 may be configured to communicate with a DNS server. In some embodiments, the name resolution device 114 may perform additional functions beyond name resolution. In some embodiments, the name resolution device 114 may comprise a DHCP server. The name resolution device 114 may thus maintain a data store of private network addresses allocated to local address space computing devices and placeholder network addresses associated with external computing devices, as described below.

The exemplary operating environment 100 may include two address space scopes: an external scope of an external address space 102 and a local scope of a private address space 104 including the network 106. In some embodiments, the external address space 102 may include an external network, a global address space, etc. It is appreciated that the operating environment 100 may include additional address scopes. For example, the exemplary operating environment 100 may include additional private address scopes (e.g., associated with other private networks that communicate with the external address space 102, FIG. 4, etc.). The network device 112 may be configured to facilitate communication between a private address space 104 and an external address space 102. In some embodiments, the network device 112 may have a first communication interface in an external address space 102 and a second communication interface in a private address space 104.

Figure 1B:
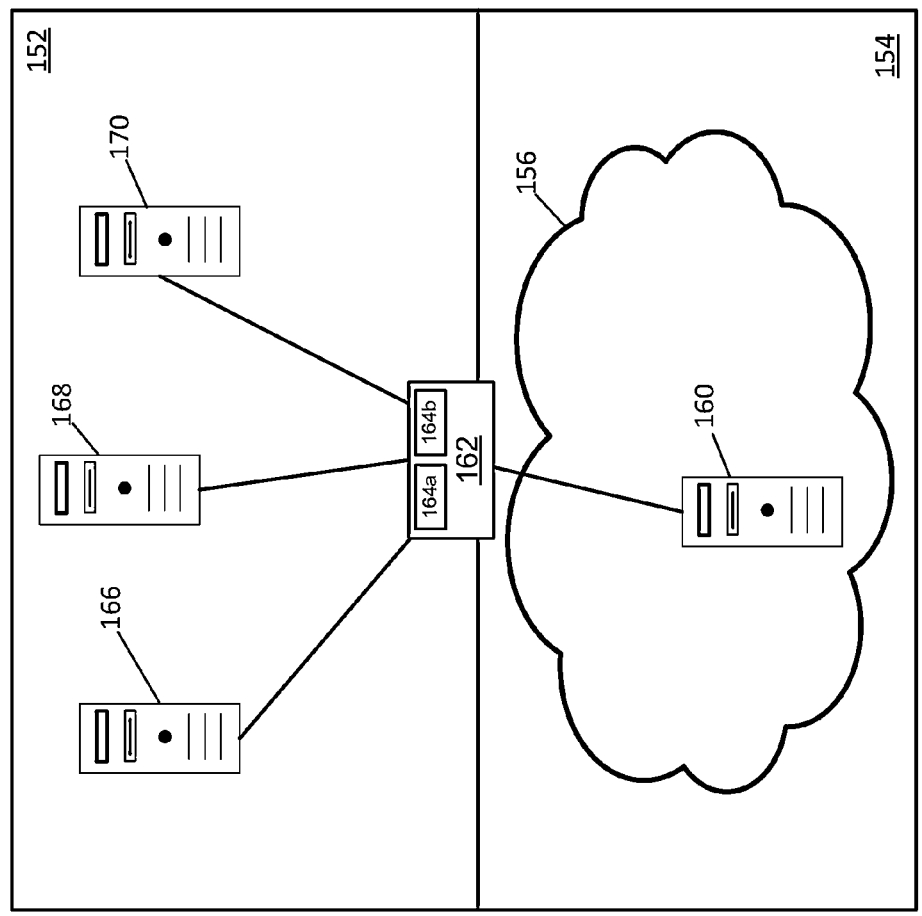
FIG. 1B shows another exemplary operating environment in accordance with some embodiments.

FIG. 1B shows another exemplary operating environment in accordance with some embodiments. The exemplary operating environment 150 includes an external address space 152, a private address space 154, a client 160, an address resolution and mapping system 162, and an Internet server 166. In some embodiments, the exemplary operating environment 150 may include an optional computing device 168 (e.g., an Internet server, service provider, cloud device, etc.) and an optional name resolution device 170. The client 160 is coupled to the address resolution and mapping system device 162 via a network 156. The Internet server 166, computing device 168, and name resolution device 170 are coupled to the address resolution and mapping system device 162. It is appreciated that any number of computing devices (e.g., client 160, servers 166-168, etc.), name resolution devices, network devices, etc., may be a part of an exemplary operating environment 150.

Before proceeding to further describe the various components of an operating environment 150, it is appreciated that the devices 160, 162, 166, 168, and 170 are exemplary and are not intended to limit the scope of the embodiments. For example, an operating environment 150 may include other devices, such as workstations, modems, printers, bridges, hubs, voice over internet protocol (IP) telephones, IP video cameras, computer hosts, etc.

The client 160 may be any of a variety of computing devices including, but not limited to, computers, servers, desktop computers, laptops, tablets, mobile devices, smartphones, printers, fax machines, etc. The server 166 may be any of a variety of computing devices including, but not limited to, computers, servers, desktop computers, laptops, tablets, mobile devices, smartphones, printers, fax machines, etc.

The client 160 may send communication requests to an address resolution and mapping system 162 for communication with devices in the external address space 152. The client 160 may have a network address that is allocated via direct allocation, static allocation, Dynamic Host Configuration Protocol (DHCP), etc.

In some embodiments, the address resolution and mapping system 162 may have substantially similar functionality to the network device 112 and the name resolution device 114. In some embodiments, the address resolution and mapping system 162 may have a network device component 164a and a name resolution component 164b.

The network device component 164a may be a hub, a switch, a gateway, a router, a wireless router, a wireless access point, etc. The network device component 164a may be operable to perform NAT. For example, network device component 164a may translate an address in a communication request from a client 160 for communication of the request to a server 166 and the network device component 164a may further translate an address of a response to the request for communication from an Internet server 166 to the client 160. The network device component 164a may have one or more interfaces that are addressable in each of a first network (e.g., a private network, an internal network, etc.) and a second network (e.g., a public network, the Internet, etc.).

The name resolution component 164b may be configured to translate a name into a network address. For example, the name resolution component 164b may translate symbolic names, including domain names. A symbolic name may be a label associated with a service, entity, device, etc., that can be mapped to an IP address. The symbolic name may be a human-readable identifier such as the domain portion of a Uniform Resource Locator (URL) comprising a domain name. In some embodiments, the name resolution component 164b may comprise a cache configured for use in translating a symbolic name. The name resolution component 164b may use any protocol that uses symbolic names to locate services, network addresses, etc.

In some embodiments, the name resolution component 164b is a DNS server. For example, a client 110 may send a DNS lookup request to a name resolution component 164b to translate the symbolic name "www.google.com" to an IP address. In some embodiments, the name resolution component 164b may be configured to communicate with a DNS server. In some embodiments, the name resolution component 164b may perform additional functions beyond name resolution. In some embodiments, the name resolution component 164b may comprise a DHCP server. The name resolution component 164b may thus maintain a data store of private network addresses allocated to local address space computing devices and placeholder network addresses associated with external computing devices, as described below.

In some embodiments, the address resolution and mapping system 162 is configured to perform a method for establishing communication link (e.g., between two or more devices such as the client 160, the server 166, etc.). The method may include sending a communication from a first device to an address resolution and mapping system requesting an address for a second device. In some embodiments, the address resolution and mapping system is configured to establish a communications link between the first device addressable within a first network and a second device addressable within a second network. In some embodiments, the first network and the second network are communicatively linked by the address resolution and mapping system that is addressable within the first network and addressable within the second network. The method may further include resolving with the address resolution and mapping system an address in the second network for the second device and allocating with the address resolution and mapping system a first mappable address within the first network. The method may further include responding with the address resolution and mapping system to the first device with the first mappable address and creating with the address resolution and mapping system a first mapping between the first mappable address and the resolved address. The method may further include allocating with the address resolution and mapping system a second mappable address within the second network and creating with the address resolution and mapping system a second mapping between the second mappable address and an address of the first device in the first network. In some embodiments, communications on the first network from the first device to the second device are addressed from the address of the first device to the first mappable address. In some embodiments, communications on the second network from the second device to the first device are addressed from an address of the second device to the second mappable address.

The exemplary operating environment 150 may include two address space scopes: an external scope of an external address space 152 and a local scope of a private address space 154 including the network 156. In some embodiments, the external address space 152 may include an external network, a global address space, etc. It is appreciated that the operating environment 150 may include additional address scopes. For example, the exemplary operating environment 150 may include additional private address scopes (e.g., associated with other private networks that communicate with the external address space 102, external address space 152, FIG. 4, etc.). The name resolution and mapping system 162 may be configured to facilitate communication between a private address space 154 and an external address space 152. In some embodiments, the name resolution and mapping system 162 may have a first communication interface in an external address space 152 and a second communication interface in a private address space 154.

Figure 2:
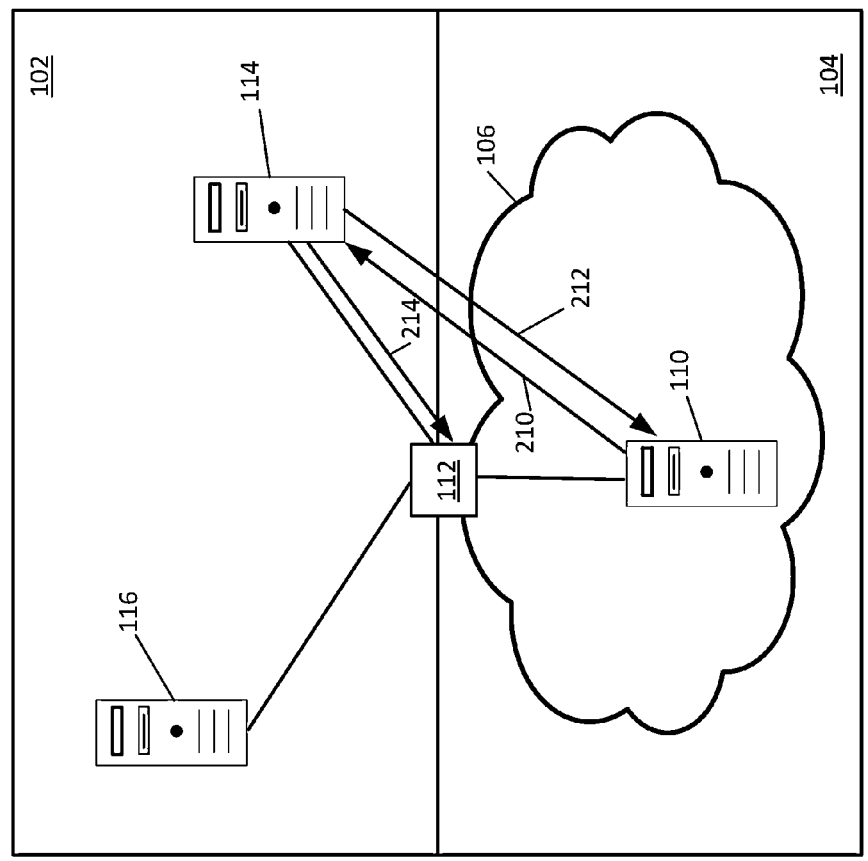
FIG. 2 shows exemplary communications during name resolution in accordance with some embodiments.

FIG. 2 shows exemplary communications during name resolution in accordance with one embodiment. Diagram 200 includes an external address space 102, a private address space 104, a network 106, a client 110, a network device 112, a name resolution device 114, and a server 116. The exemplary communications of FIG. 2 may configure the use of a local or placeholder network address to be used to represent the server 116 within the network 106.

In some embodiments, a client 110 may have an address on a network 106 that is the same as an address in the external address space 102 while not conflicting because the address is used in a different scope (e.g., external address space 102 and private address space 104). For example, the client 110 may have the IP address of 202.11.7.3 in the local scope of the private address space 104 and a server 116 may also have the IP address of 202.11.7.3 in the external scope of external address space 102.

The client 110 sends a name resolution request message 210 to a name resolution device 114 to translate a symbolic name to a network address. In some embodiments, the name resolution request message 210 is a DNS lookup request. For example, the name resolution request message 210 may include a request for the IP address associated with the symbolic name of "www.google.com."

The name resolution device 114 may determine a global or external address for the symbolic name, determines a placeholder network address, and returns the placeholder network address to the client 110 in a message 212. The placeholder address may uniquely identify a server 116 with respect to a private address space 104. The placeholder network address may be selected or determined from a contiguous range of addresses, one or more disparate ranges of addresses, a number of unrelated addresses, etc. The placeholder network address may be statically (e.g., predetermined, preconfigured, etc.) or dynamically determined. For example, an address range of 1.0.0.0/10 may be used for placeholder network addresses and a globally routable range of 137.9.1.0/24 for network 106. As another example, the name resolution device 114 may resolve "www.google.com" to 202.11.7.3 and return placeholder address of 1.0.0.1 to the client 110.

The name resolution device 114 communicates a mapping of the placeholder network address and an external or global network address to a network device 112 in a message 214. For example, the placeholder network address of 1.0.0.1 may be mapped to the global network address of 202.11.7.3. The mapping may be used by the network device 112 to translate between the placeholder network address and the global network address.

The maintenance of the mapping of internal placeholder addresses to external and/or global addresses facilitates the use of overlapping address ranges in the private address space 104 and the external address space 102. Embodiments are thus able to isolate the private address space 104 from the external address space 102. The exemplary communications of FIG. 2 may thus configure the network device 112 to facilitate communication between a client 110 and a server 116 while the client 110 and the server 116 have the same or overlapping addresses. The exemplary communications of FIG. 2 and FIG. 3 may allow a client 110 and a server 116 to have the same IP address (e.g., 202.11.7.3) in different scopes and thereby communicate without conflicting. Embodiments are configured for use of any protocol that utilizes symbolic name resolution to locate services (e.g., computing devices, servers, etc.).

In some embodiments, a placeholder network address is temporarily allocated and after the communication is complete, the placeholder network address mapping may be deleted or the placeholder network address recycled for future use. In some embodiments, the placeholder network address may have a predefined lifetime. The mapping of the placeholder address may also have a predefined lifetime. The placeholder network address may thus be unique to a particular instance of communication. In some embodiments, the placeholder address may further include one or more numbers, a range of numbers, a port, etc.

Figure 3:
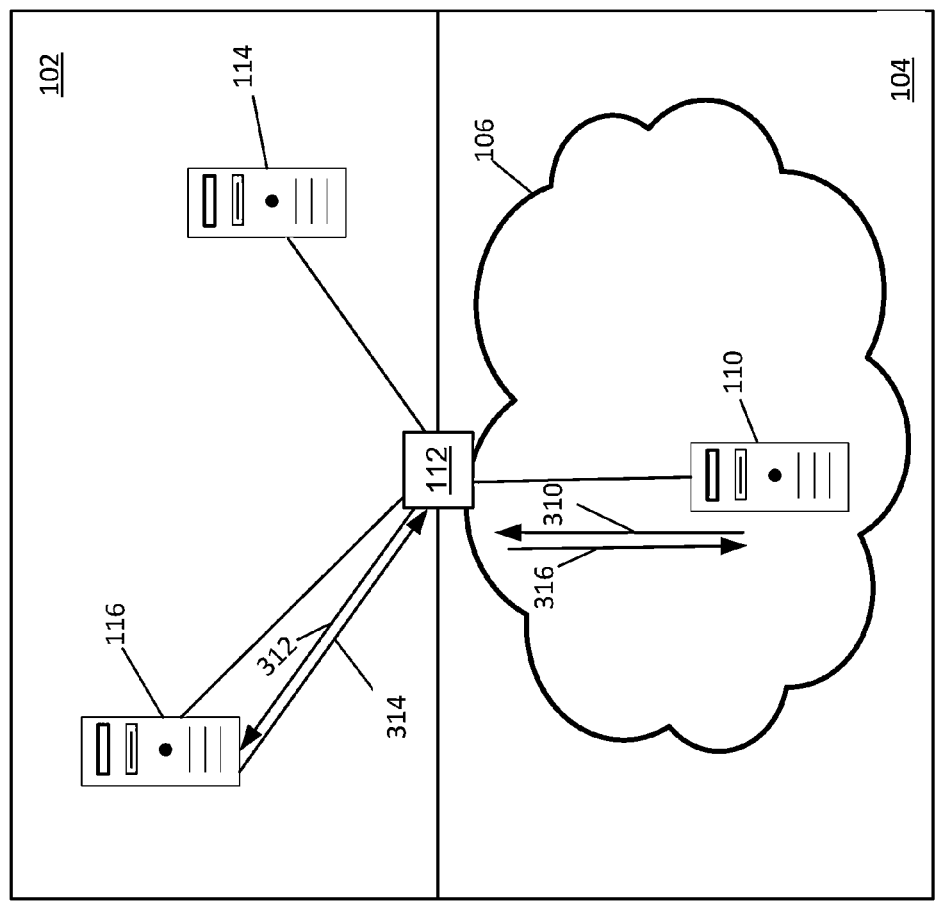
FIG. 3 shows exemplary communications during a communication request in accordance with some embodiments.

FIG. 3 shows exemplary communications during a communication request in accordance with some embodiments. Diagram 300 includes an external address space 102, a private address space 104, a network 106, a client 110, a network device 112, a name resolution device 114, and a server 116. In some embodiments, some of the exemplary communications of FIG. 3 are performed subsequent to the exemplary communications of FIG. 2.

The client 110 sends a request message 310 to a network device 112. The request message 310 may have a destination address of the placeholder network address received from the name resolution device 114. For example, the client 110 may send a request from IP address 202.11.7.3 to the placeholder address of 1.0.0.1.

The network device 112 may translate a portion of the request and send a request message 312 to a server 116. The network device 112 may perform Network Address Translation (NAT) for the internal address range of a network 106 and use the mapping (e.g., from steps 212 and 214) from a name resolution device 114 for the destination address. For example, a network device 112 may have an external address of 137.9.1.15 in the global address space and the request is sent from address 137.9.1.15 to a server 116 at address 202.11.7.3.

The server 116 responds to a request with a response message 314. The communication from the server 116 to a network device 112 may be transparent to a client 110 and occur as normal with regard to the server 116.

The network device 112 translates a portion of the response by reversing the previous mapping and sends the translated response message 316 to the client 110. The network device 112 may replace the network address of a server 116 with a placeholder network address in the response. For example, the network device 112 sends the response with a source IP address of 1.0.0.1 to a client 110's IP address of 202.11.7.3.

In some embodiments, the server 116 may initiate a communication to a client 110 by sending a communication to a name resolution device 114. The name resolution device 114 may then determine the local network address of a client 110 and allocate a public network address of the public range assigned to the network 106 in external address space 102 for use in communication with the client 110. The name resolution device 114 may then send the allocated network address in the public range to the server 116 and send a mapping of the allocated public network address and network address of the client 110 to a network device 112. When a communication from the server 116 is received by the network device 112, the communication is sent to the client device 110 based on the mapping of the public network address associated with the client device 110 and the network address of client device 110.

Figure 4:
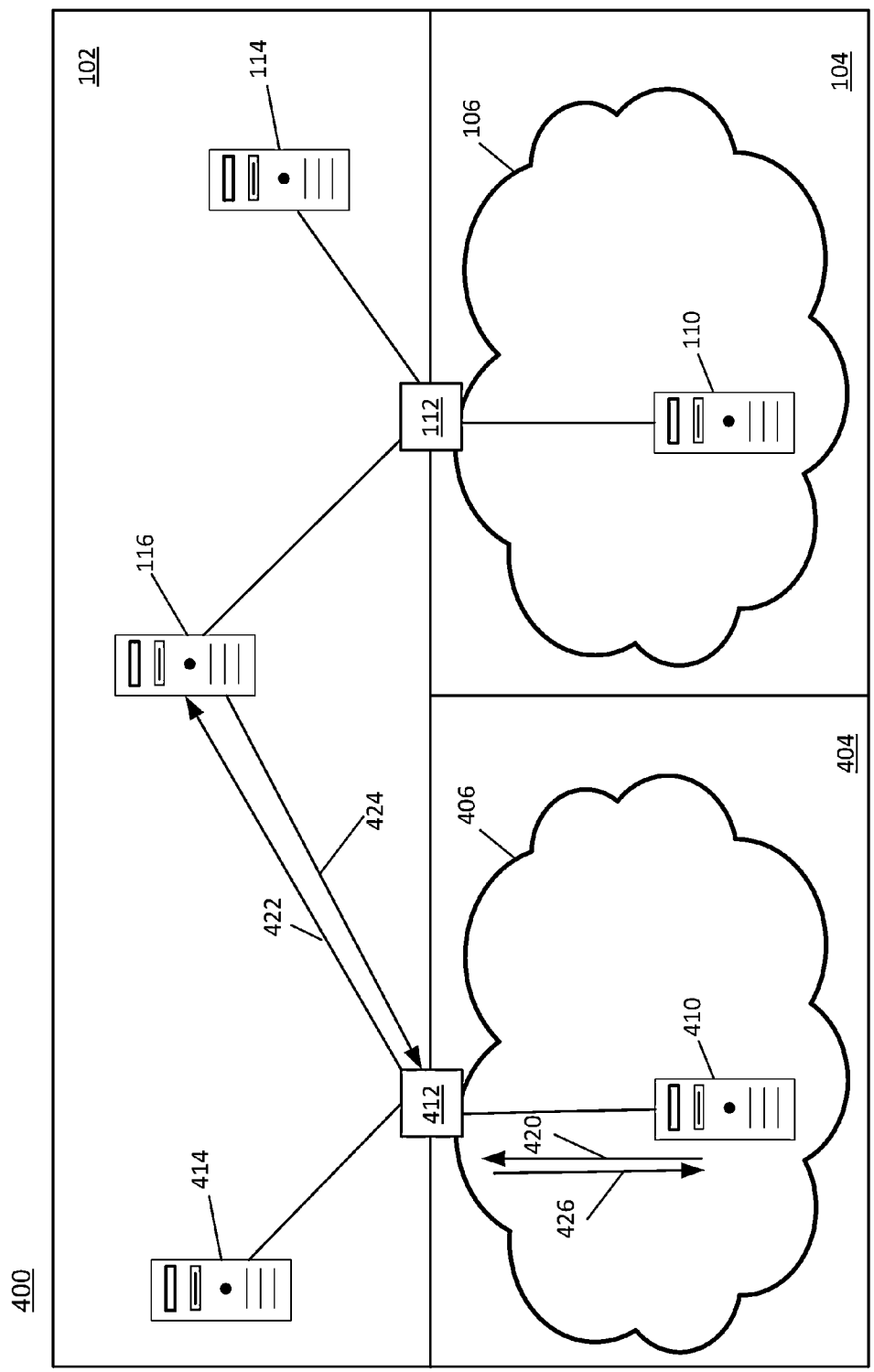
FIG. 4 shows exemplary communications during a communication request from another network in accordance with some embodiments.

FIG. 4 shows exemplary communications during a communication request from another network in accordance with some embodiments. FIG. 4 depicts two internal or private networks (e.g., networks 406 and 106) configured for utilizing network addresses that are outside of the private or internal network address ranges specified by the network address protocols. For example, the networks 106 and 406 may each use substantially all of the IPv4 address space for internal or private addressing. Embodiments may thus allow a computing device 110 of network 106, a computing device 410 of network 406, and a server 116 to each have the same network address without conflict. For example, the computing device 110, the computing device 410, and the server 116 may each have IP address 202.11.7.3.

Diagram 400 includes an external address space 102, a local address space 104, a local address space 404, a first network 106, a client 110, a network device 112, a name resolution device 114, a server 116, a second network 406, a client 410, a network device 412, and a name resolution device 414. The first network 106, client 110, and a portion of the network device 112 reside in a first private address space 102. The second network 406, client 410, and a portion of network device 412 may reside in a second private address space 404. A server 116, a name resolution device 114, a name resolution device 414, a portion of network device 112, and a portion of network device 412 may reside in an external address space 102.

The network device 412 may be a hub, a switch, a gateway, a router, a wireless router, a wireless access point, etc. The client 410 may be any of a variety of computing devices including, but not limited to, computers, servers, desktop computers, laptops, tablets, mobile devices, smartphones, printers, fax machines, etc. The name resolution device 114 is configured to translate a name into a network address. For example, the name resolution device 114 may translate symbolic names, including domain names. It is noted that the name resolution device 114 may perform additional functions beyond name resolution (e.g., DHCP, placeholder network address translation, etc.). In some embodiments, the name resolution device 114 is a Domain Name System (DNS) server. For example, a client 410 may send a DNS lookup request to a name resolution device 414 to translate the symbolic name "www.google.com" to an IP address.

The communications of FIG. 4 may be performed after the client 410 has made a name resolution request to a name resolution device 414 and received a response with a local network address within a private address space 404, e.g., in a manner similar to that described above. The name resolution device 414 may have sent a mapping of the local network address (e.g., a placeholder network address) and a network address of a server 116 to a network device 412 thereby allowing the network device 412 to translate communications received from the client 410 to be sent to the server 116. In some embodiments, some of the exemplary communications of FIG. 4 are performed subsequent to the exemplary communications of FIG. 2 are performed with respect to the server 116 and the name resolution device 414.

The client 410 sends a request message 420 to a network device 412. The request message 420 may have a destination address of the placeholder network address received from the name resolution device 414. For example, a client 410 may send a request from IP address 202.11.7.3 to the placeholder address of 1.0.0.1.

The network device 412 may translate a portion of the request and send a request message 422 to a server 116. The network device 412 may perform Network Address Translation (NAT) for the internal address range of a network 406 and use the mapping (e.g., from steps 212 and 214) from a name resolution device 414 for the destination address. For example, a network device 412 may have an external address of 137.9.1.15 in the global address space and the request is sent from address 137.9.1.15 to a server 116 at address 202.11.7.3.

The server 116 responds to the request message 422 with a response message 424. The communication from server 116 to network device 412 may be transparent to client 410 and occur as normal with regard to server 116.

The network device 412 translates a portion of the response by reversing the previous mapping and sends a translated response message 426 to a client 410. The network device 412 may replace the network address of a server 116 with the placeholder network address in the response. For example, a network device 112 sends the response with a source IP address of 1.0.0.1 to a client 110's IP address of 202.11.7.3.

Figure 5:
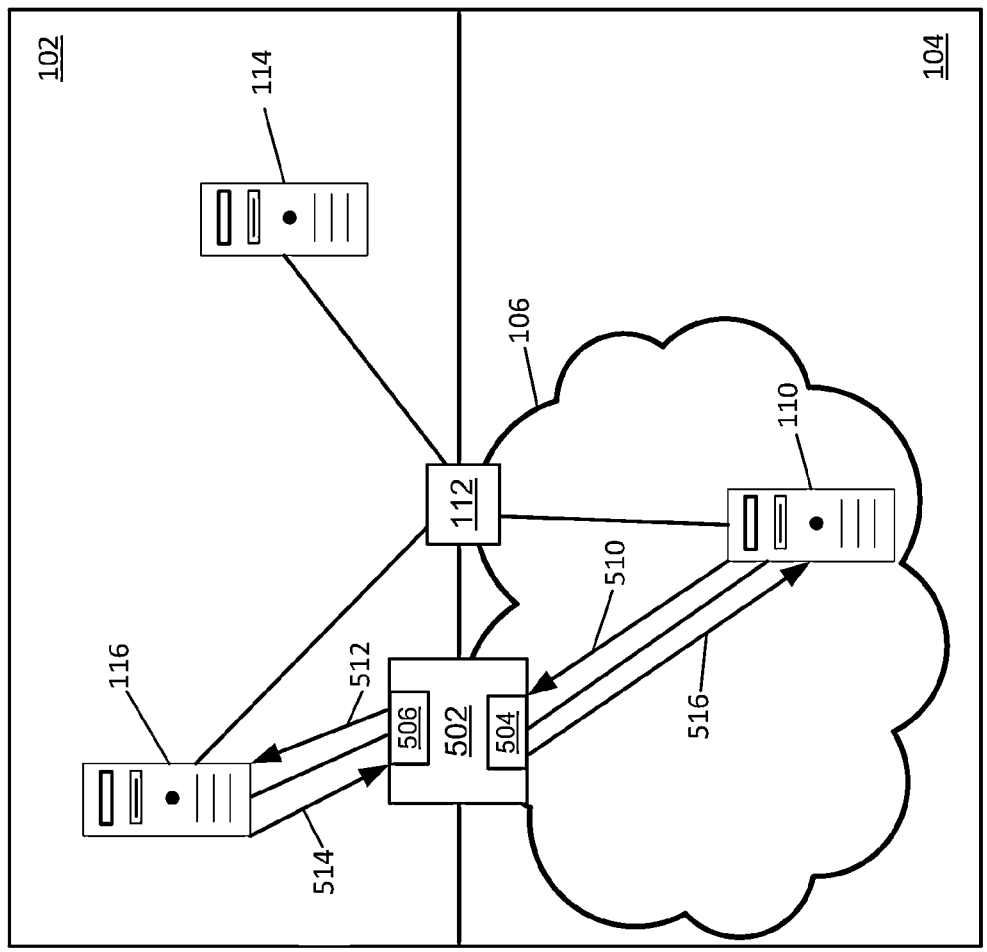
FIG. 5 shows exemplary communications with an embedded network address in accordance with some embodiments.

FIG. 5 shows exemplary communications with an embedded network address in accordance with some embodiments. Diagram 500 includes an external address space 102, a local address space 104, a network 106, a client 110, a network device 112, a name resolution device 114, a server 116, and a proxy 502. In some embodiments, the proxy 502 is integrated into or be part of a network device 112, which may further include a name resolution device 114. In some embodiments, proxy 502 may be a proxy server or have substantially similar functionality.

Embodiments may be configured to support services (e.g., requests, queries, communications, etc.) that embed network addresses (e.g., IP addresses) directly into the application stream (e.g., http://202.11.7.3/index.html, http://209.1.2.3/main.shtml, http://208.218.100.20/home.cgi, etc.). In some embodiments, the proxy 502 may be used to bridge the boundary between the local and the external and/or global address scopes. For example, the proxy 502 may bridge the local and global address scopes at the application layer. In some embodiments, directly accessing the global-scope resources via an IP address is not possible without a DNS resolution because the globally-scoped address has no meaning in the mapped local scope. In some embodiments, a data store of external network addresses is maintained and the external network addresses are not allocated in or used for the internal network while the remainder of the network address space is used. For example, a list of IP addresses of Internet servers may be maintained and the remainder of the IPv4 address space is used for internal network devices.

In some embodiments, the proxy device 502 may be a HyperText Transfer Protocol (HTTP) proxy on the network boundary and is accessible by a client 110 using internal addressing. In some embodiments, the proxy device 502 may be a non-transparent HTTP proxy. The proxy device 502 may be configured to resolve external resources based on an external interface and thus can bridge the gap between the external address space 102 and the private address space 104.

In some embodiments, the proxy device 502 includes an internal interface 504 and an external interface 506. The internal interface 504 may be within a private address space 104 of a network 106. The external interface 506 may be within an external address space 102. The proxy device 502 may thus bridge a local or private address space 104 and an external address space 102.

In some embodiments, the proxy device 502 receives a request (e.g., request message 510) from a client 110 via a communication (e.g., TCP/IP, UDP, etc.) on the internal interface 504. The proxy device 502 may then analyze the application layer to determine whether the communication is a hypertext transfer protocol (HTTP) communication. The proxy device 502 may then send the communication via an external interface 506.

In some embodiments, the client 110 is configured to use a proxy device 502 for communication with an external address space 102. In some embodiments, requests to a network device 112 from a client 110 are communicated to a proxy device 502.

The client 110 sends a request message 510 to the proxy device 502. The request message 510 may be sent to or received via the internal interface 506 of the proxy device 502. The request message 510 may include an IP address. For example, the request may be an HTTP request to access http://202.11.7.3/index.html.

The proxy device 502 sends a request message 512 to a server 116. The request message 512 to the server 116 may be sent via an external interface 504. In some embodiments, the proxy device 502 modifies the source address of request to be the IP address of the external interface 506 of the proxy device 502. For example, if the external interface 504 of the proxy device 502 has an IP address of 139.9.1.21 and a client 110 has an IP address of 137.9.1.16, the proxy device 502 may modify the request so that source address in the request is 139.9.1.21.

A response message 514 from the server 116 may be sent to the proxy device 502. The response message 514 may be sent to the external interface 506 of a proxy device 502. A response message 516 from the server 116 may be sent to the client 110. The proxy device 502 thus can bridge the local, private address space 104 of a network 106 and an external address space 102.

Figure 6:
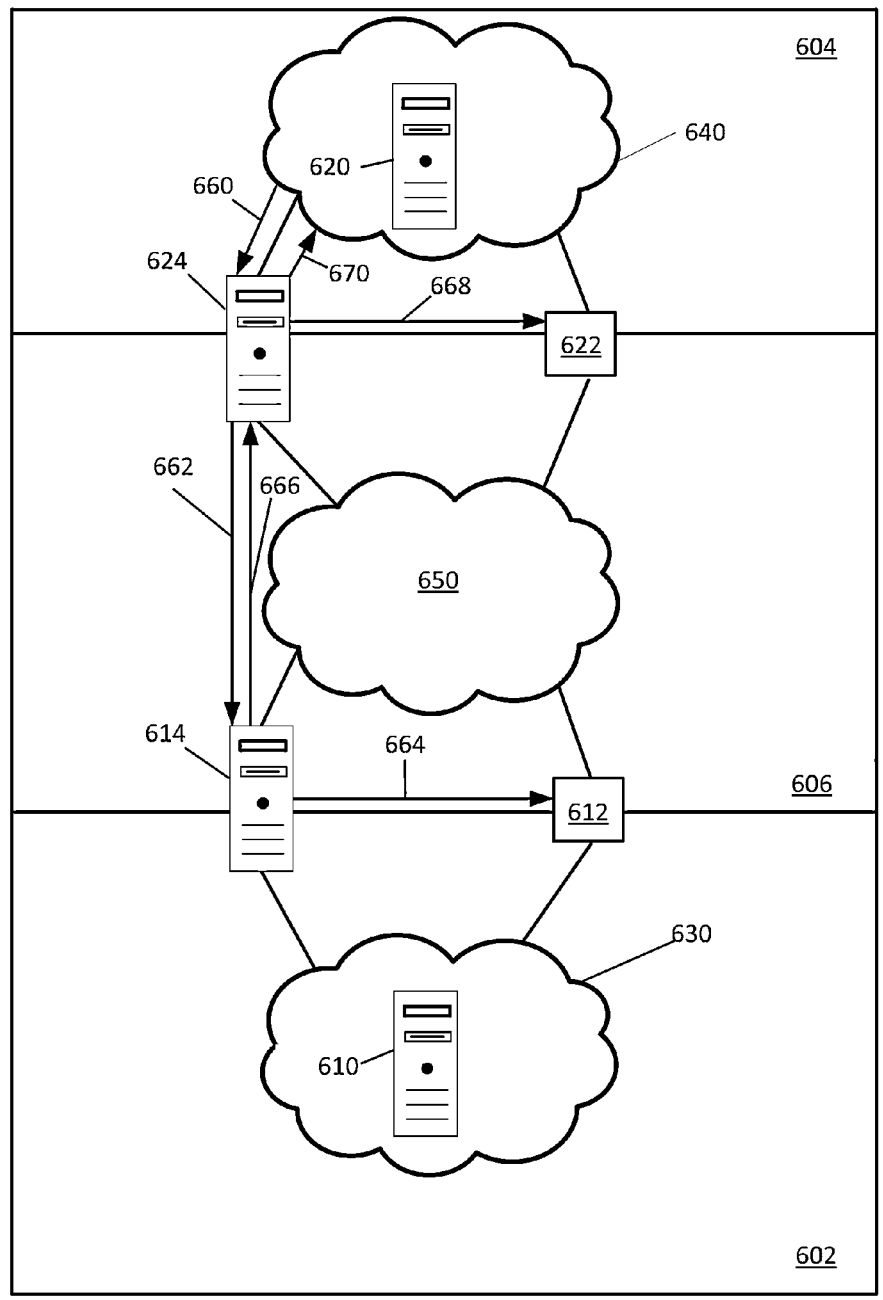
FIG. 6 shows exemplary communications during peer-to-peer communications in accordance with some embodiments.

FIG. 6 shows exemplary communications during peer-to-peer communications in accordance with some embodiments. Diagram 600 includes a local or private address space 602, a local or private address space 604, an external address space 606, a computing device 610, a computing device 620, a name resolution device 614, a name resolution device 624, a network device 612, a network device 622, networks 630, 640, and 650. External address space 606 includes portions of the network devices 612 and 622, portions of the name resolution devices 614 and 624, and the network 650. Local or private address space 602 includes the computing device 610, a portion of the network device 612, a portion of the name resolution device 614, and the network 630. Local or private address space 604 includes the computing device 620, a portion of the network device 622, a portion of the name resolution device 624, and the network 640. In some embodiments, networks 630-640 are local networks and network 650 is an external network (e.g., a public network, the Internet, etc.). FIG. 6 depicts peer-to-peer communications between private address spaces that utilize addressing outside of the private addressing ranges. For example, networks 630 and 640 may utilize network addresses outside of private address ranges specified by IPv4.

The network devices 612 and 622 may be a hub, a switch, a gateway, a router, a wireless router, a wireless access point, etc. Client 610 is coupled to a network device 612 and a name resolution device 614 via a network 630. Client 620 is coupled to a network device 622 and a name resolution device 624 via a network 640. The network devices 612, 622, name resolution device 614, and name resolution device 624 are coupled via network 650.

In some embodiments, the name resolution device 614 is configured to determine a public name associated with a network address of a computing device 610 and the name resolution device 624 is configured to determine a public name associated with a network address of computing device 620. The name resolution devices 614 and 624 are configured to provide the respective public addresses of the computing devices 610 and 620 in response to queries for their respective public names.

Client 620 sends a request message 660 to name resolution device 624 to resolve a symbolic name associated with client 610. For example, client 620 may have an IP address of 112.11.7.3 and client 610 may have the IP address of 202.11.7.3. Client 620 may thus send a request to a name resolution device 624 for the IP address of client 610 based on a symbolic name of "client1.domainname."

The name resolution device 624 sends a request message 662 to a name resolution device 614 for a network address of client 610. The request may be for a public network address associated with a client 610.

An external anchored network address may be allocated to client 610 and a mapping of the external anchored network address and the private network address of client 610 may be sent as message 664 to a network device 612. The mapping of the external anchored network address and the private network address of client 610 may be used by network device 612 to send communications with a destination of the external anchored network address to client 610. In some embodiments, the external anchored network address is allocated by a name resolution device 614. In some embodiments, the external network address is allocated by a network device 612.

In some embodiments, a single network address may be allocated to a network. For example, a single IP address may be allocated to a network 630. In some embodiments, if a single network address is allocated to a network 630 or if there are no remaining external public IP addresses to be allocated, the external anchored network address may include a port, other identifier, etc. For example, the external anchored network address may include an IP address with an incorporated TCP or UDP port number.

The external anchored network address may be sent as message 666 from the name resolution device 614 to a name resolution device 624.

The name resolution device 624 may send a mapping of the external anchored network address and a local network address (e.g., placeholder network address) as message 668 to network device 622. The mapping of the external anchored network address and a local network address may be used by network device 622 to send communications (e.g., from client 620) with a destination of the local network address to network device 612 via the external anchored network address. In some embodiments, the external anchored IP address includes a port number, other identifier, etc., along with a network address. In some embodiments, the name resolution device 624 determines a local network address, which may act as a placeholder for a client 610.

The name resolution device 624 may send a response message 670 to the request for the symbolic name from client 620. The response message 670 to the request message 660 may include the local or placeholder network address determined by the name resolution device 624.

When the network device 622 receives a request for the local network address, the network device 622 may translate the local network address to the external anchored network address of client 610 based on the mapping of the local network address to the external anchored network address. The translation by the network device 622 thereby allows communication between client 620 and client 610. The communication may then be received by the network device 612. Network device 612 may then translate the external anchored network address to the network address of client 610 based on the mapping of the external anchored network address and private network address of client 610. A reverse or symmetric path for communications from client 610 to client 620 may be configured in a substantially similar manner.

Figure 7:
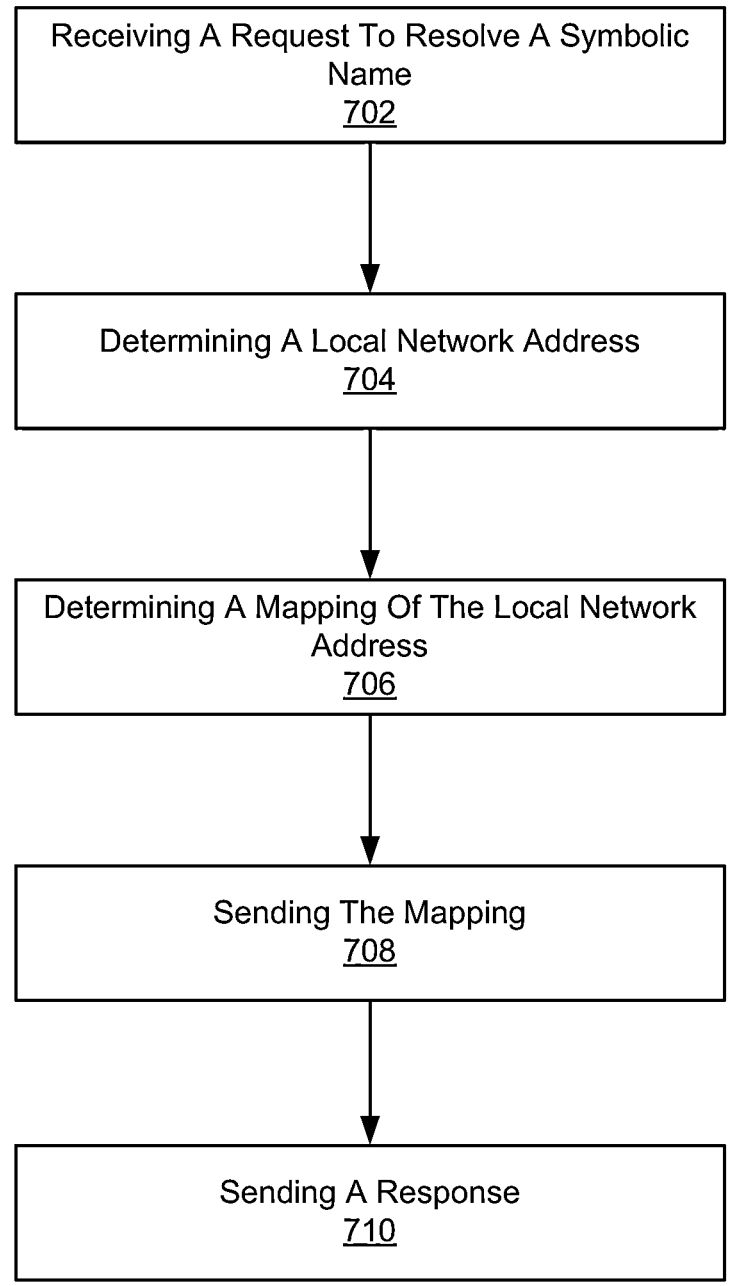
FIG. 7 shows an exemplary flow diagram of a process for processing of a name resolution request in accordance with some embodiments.

FIG. 7 shows an exemplary flow diagram of a process for processing of a name resolution request in accordance with some embodiments. In some embodiments, FIG. 7 depicts a process 700 for processing of a name resolution request from a private network utilizing network addresses outside of a private address range. For example, process 700 may be used to with an internal or private IPv4 network using IP addresses outside of private network address ranges specified by IPv4.

At block 702, a request to resolve a symbolic name associated with a network address of a computing device is received at an electronic system. In some embodiments, the network address associated with the computing device is an external network address (e.g., global network address, etc.). In some embodiments, the request to resolve the symbolic name associated with the computing device is received from another computing device in a private network with a network address outside of a private Internet Protocol version 4 (IPv4) address range. In some embodiments, the request to resolve the symbolic name associated with the network address of the computing device is received at a Domain Name System (DNS) device.

At block 704, a local network address associated with the computing device is determined. The local network address may be a placeholder network address for representing an external and/or global network address within a private or internal network address space. In some embodiments, the local or placeholder network address is in an allocated local network address range associated with an external network address space. In some embodiments, the local network address associated with the computing device is outside of a private network address range. In some embodiments, the external network address space is an IPv4 address space and the local network address is outside of a private IPv4 address range.

At block 706, a mapping of the local network address and the network address associated with the computing device is determined. In some embodiments, the mapping may include a placeholder IP address and an external IP address of the computing device.

At block 708, the mapping of the local network address and the network address associated with the computing device is sent. In some embodiments, the sending comprises sending the mapping of the local network address and the network address associated with the computing device to a network device. In some embodiments, the network device is a gateway device, a router, a switch, etc.

At block 710, a response to the request is sent. The response may be sent to a computing device in an internal or private network with a network address outside of an internal or private address space, as described above. The response may include the placeholder network address.

Figure 8:
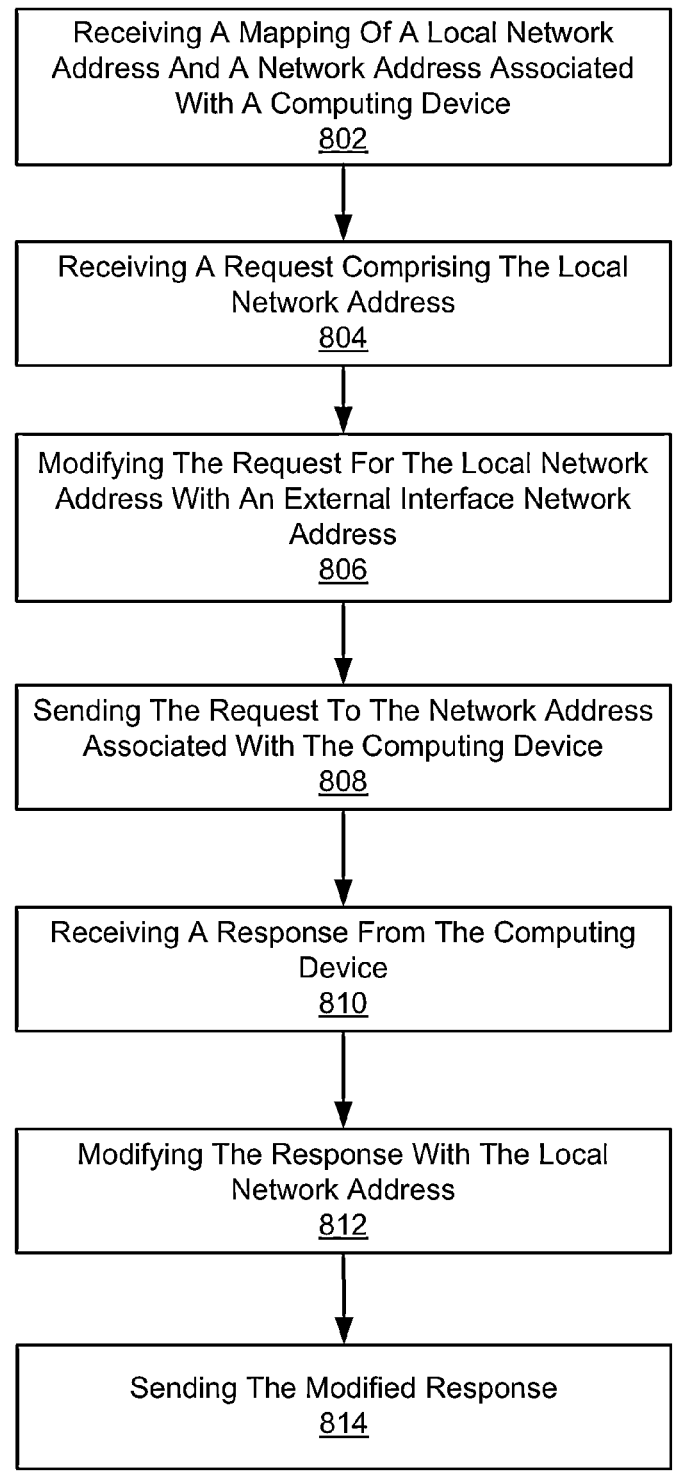
FIG. 8 shows an exemplary flow diagram of a process for processing of a communication request to another network in accordance with some embodiments.

FIG. 8 shows an exemplary flow diagram of a process for processing of a communication request to another network in accordance with some embodiments. In some embodiments, FIG. 8 depicts a process 800 for processing of a request to be sent to an external network, a public network, the Internet, etc. For example, process 800 may be used to process a request from a computing device with a network address outside of a private address range within an internal or private IPv4 network, which is being sent to an external network using global IPv4 network addresses.

At block 802, a mapping of a local network address and a network address associated with a computing device is received at a port of an electronic system. The electronic system may be a network device, a router, a gateway, etc. In some embodiments, the network device is configured for routing of a data packet. In some embodiments, the local network address or placeholder network address is in an allocated local network address range associated with an external (e.g., global, etc.) network address space.

In some embodiments, the mapping of a local network address and a network address associated with a computing device is received from a DNS device. In some embodiments, the local network address is outside of a private IPv4 address range. In some embodiments, the network address associated with the computing device is within a global IPv4 address space.

At block 804, a request comprising the local network address is received. The request may be a request to communicate with a computing device (e.g., server, service provider, cloud, etc.) in an external network.

At block 806, the request for the local network address is modified with an external interface network address. The modification may be part of the performance of Network Address Translation (NAT).

At block 808 the request to the network address associated with the computing device is sent based on the mapping of the local network address and the network address associated with the computing device.

At block 810, a response from the computing device is received. The response may be received from an external network, a public network, the Internet, etc.

At block 812, the response is modified with the local network address based on the mapping of the local network address and the network address associated with the computing device. The response may thus be modified for sending to the computing device that sent the request (e.g., as part of NAT, other network traversal procedure, etc.).

At block 814, the modified response is sent. The modified response may be sent to a computing device originated the communication request. The computing device that originated the communication request may be on an internal or private network.

Figure 9:
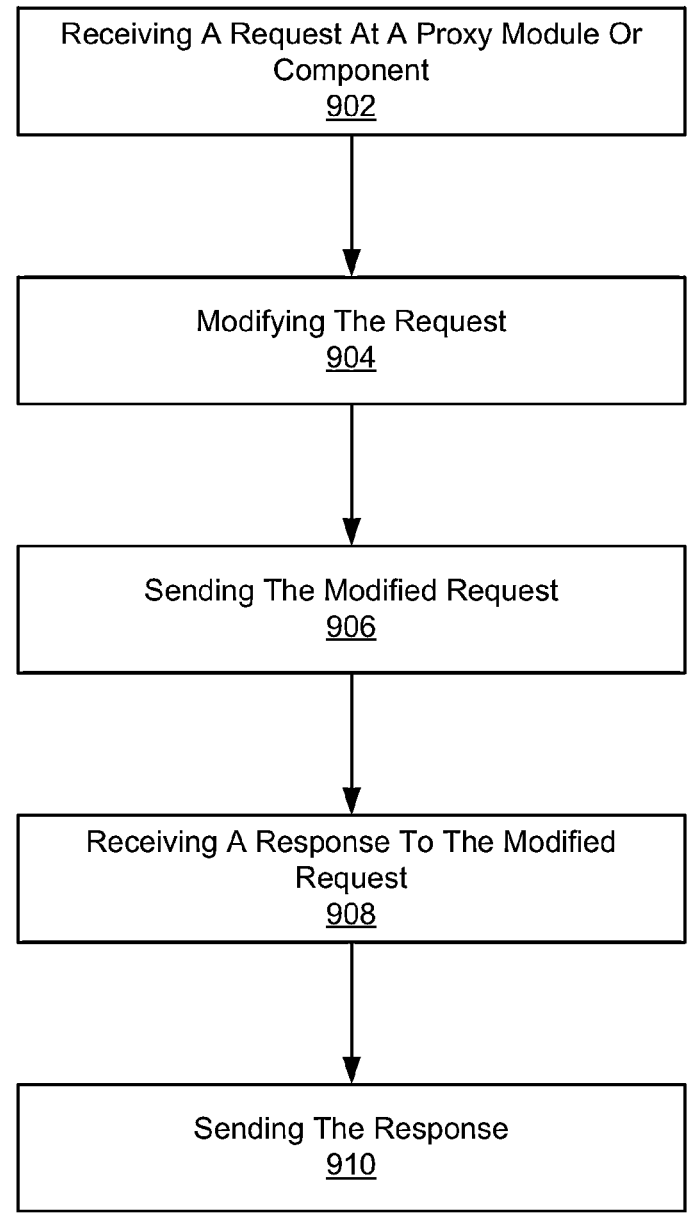
FIG. 9 shows an exemplary flow diagram of a process for processing of a communication request comprising an embedded network address to another network in accordance with some embodiments.

FIG. 9 shows an exemplary flow diagram of a process for processing of a communication request comprising an embedded network address for another network in accordance with some embodiments. In some embodiments, FIG. 9 depicts a process 900 for processing of a request with an embedded network address. For example, the request may include a direct IP address reference of http://202.11.7.3/home.html. Process 900 may be used to process a request from a computing device with a network address outside of a private address range within an internal or private IPv4 network that is being sent to an external network using global IPv4 network addresses. The request may be received at a proxy module or component. The proxy module or component may be integrated into a network device or separate, as described above.

At block 902, a request is received at a proxy module or component. The request may comprise a network address. For example, the request may include a direct or embedded IP address reference of http://202.11.7.3/home.html. The request may be received at a proxy device configured to bridge one or more networks at the application layer, as described herein.

At block 904, the request is modified. In some embodiments, the request may be modified for sending from a proxy module or component (e.g., via an output port, external interface, etc.) to a computing device in another network.

At block 906, the modified request is sent. In some embodiments, the request may be sent to an external network via an output component of the proxy module or component (e.g., via an output port, external interface, etc.).

At block 908, a response to the modified request is received. The response may be received from an Internet server, computing device in an external network, etc. The response may be modified for sending to the computing device that originated the request (e.g., via NAT, other network traversal procedure, etc.).

At block 910, the response is sent. The response may be sent to the computing device that sent or originated the request.

Figure 10:
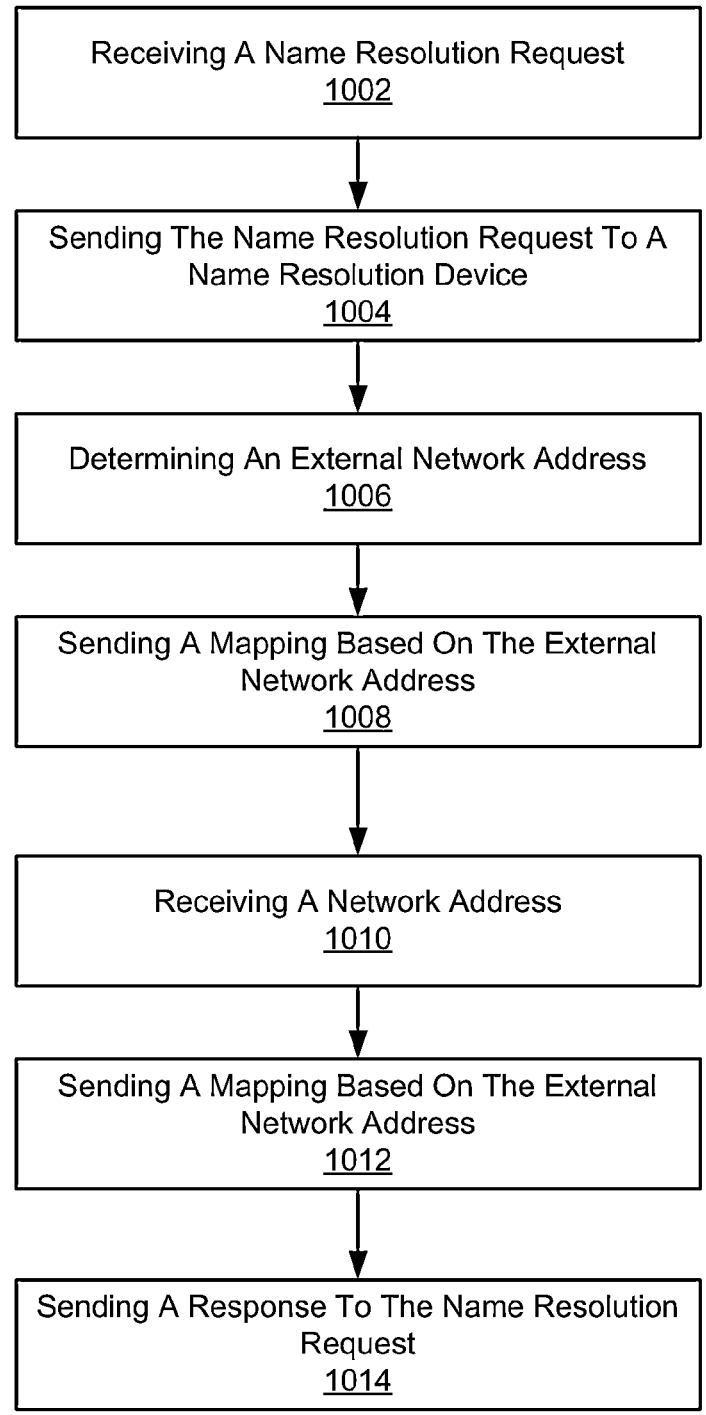
FIG. 10 shows an exemplary flow diagram of a process for processing of peer-to-peer communications in accordance with some embodiments.

FIG. 10 shows an exemplary flow diagram of a process for processing of peer-to-peer communications in accordance with some embodiments. In some embodiments, FIG. 10 depicts a process 1000 for processing of a peer-to-peer request between internal networks using network addresses outside of internal or private address ranges. For example, process 1000 may be used to process a request from a computing device with a first network address outside of a private address range within an internal or private IPv4 network that is being sent to another computing device with a second network address outside of a private address range within another internal or private IPv4 network.

At block 1002, a name resolution request is received. The name resolution request may include a name associated another computing device in a different private or internal network (e.g., a name resolution request from client 620 to resolve an address for client 610). The name resolution request may be received by a name resolution device, e.g., a DNS server.

At block 1004, the name resolution request is sent to another name resolution device. The name resolution request may be sent from the name resolution device (e.g., name resolution device 624) associated with the client (e.g., client 620) that sent the name resolution request. The name resolution request may be sent to the name resolution device (e.g., name resolution device 614) that is associated with the client (e.g., client 610) that is associated with the name of the name resolution request.

At block 1006, an external network address is determined. In some embodiments, the external network address may be determined by a name resolution device (e.g., name resolution device 614) associated with the client (e.g., client 610) associated with the name in the name resolution request. In some embodiments the external network address may be determined by a network device, as described above. In some embodiments, the external network address may be allocated from a range of network addresses, or may be a combination of a network address with a port number or other identifier, etc., as described above.

At block 1008, a mapping based on the external address is sent. The mapping may be a mapping of an external network address and an internal or private network address of a computing device (e.g., client 610). In some embodiments, the mapping may be sent from a name resolution device (e.g., name resolution device 614) to a network device (e.g., network device 612).

At block 1010, a network address is received. In some embodiments, the network address is the external network address in response to the name resolution request. In some embodiments, a local network address or a placeholder network address is determined that is associated with the network address, as described above.

At block 1012, a mapping based on the external network address is sent. The mapping may include the external network address and the local network address associated with the external network address. The mapping may be sent from a name resolution device (e.g., name resolution device 624) to a network device (e.g., network device 622).

At block 1014, a response to the name resolution request is sent. The response to the name resolution request may include the local network address or placeholder address. In some embodiments, the local network address may be outside of an internal or private network range (e.g., as specified by IPv4). The computing device that sent the name resolution request may henceforth use the local network address to communicate with the computing device whose name was part of the name resolution request.

Figure 11:
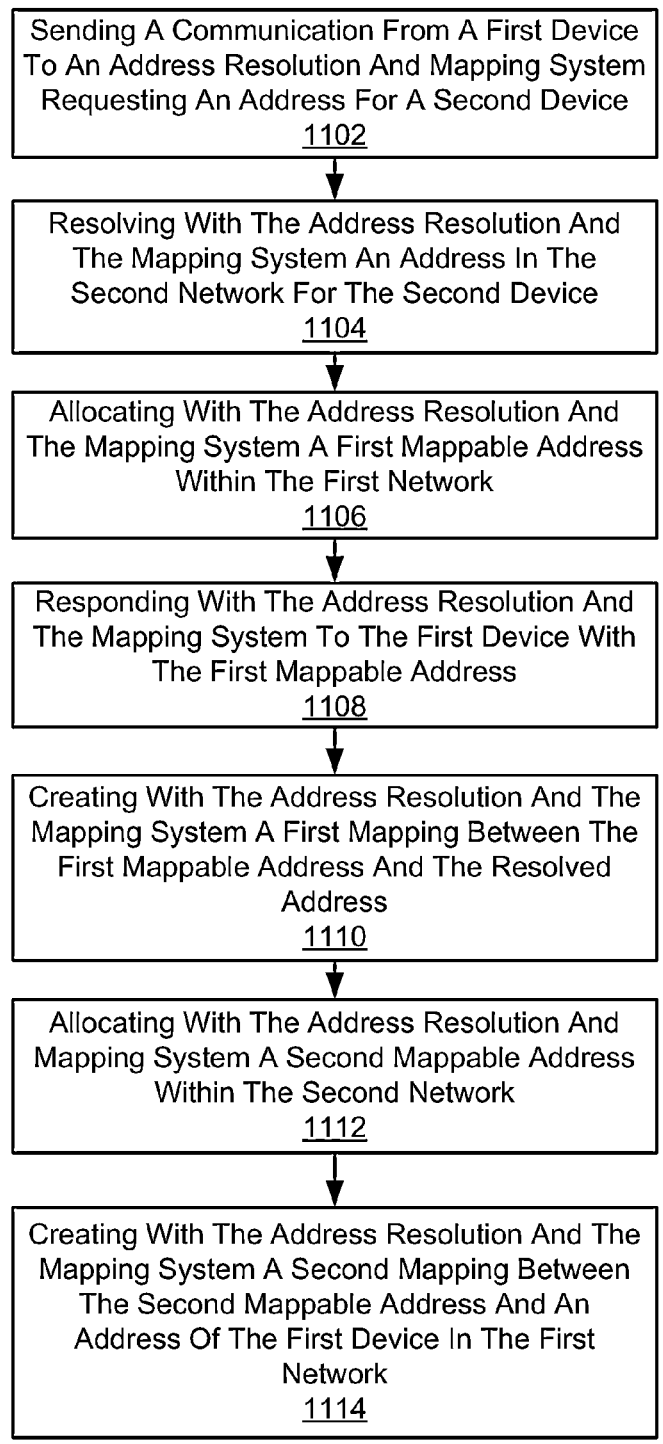
FIG. 11 shows an exemplary flow diagram of a process for establishing a communications link in accordance with some embodiments.

FIG. 11 shows an exemplary flow diagram of a process for establishing a communications link in accordance with some embodiments. In some embodiments, FIG. 11 depicts an exemplary process of establishing communication between a first device and a second device via an address mapping and resolution system, as described herein.

At block 1102, a communication is sent from a first device to an address resolution and mapping system requesting an address for a second device, as described herein. In some embodiments, the address resolution and mapping system is configured to establish a communications link between the first device addressable within a first network and a second device addressable within a second network. In some embodiments, the first network and the second network are communicatively linked by the address resolution and mapping system that is addressable within the first network and addressable within the second network.

At block 1104, an address in the second network for the second device is resolved with the address resolution and mapping system, as described herein.

At block 1106, a first mappable address within the first network is allocated with the address resolution and mapping system, as described herein.

At block 1108, the first device is responded to with the first mappable address by the address resolution and mapping system, as described herein.

At block 1110, a first mapping between the first mappable address and the resolved address is created with the address resolution and mapping system, as described herein.

At block 1112, a second mappable address within the second network is allocated with the address resolution and mapping system, as described herein.

At block 1114, a second mapping between the second mappable address and an address of the first device in the first network is created with the address resolution and mapping system, as described herein. In some embodiments, communications on the first network from the first device to the second device are addressed from the address of the first device to the first mappable address and communications on the second network from the second device to the first device are addressed from an address of the second device to the second mappable address.

Figure 12:
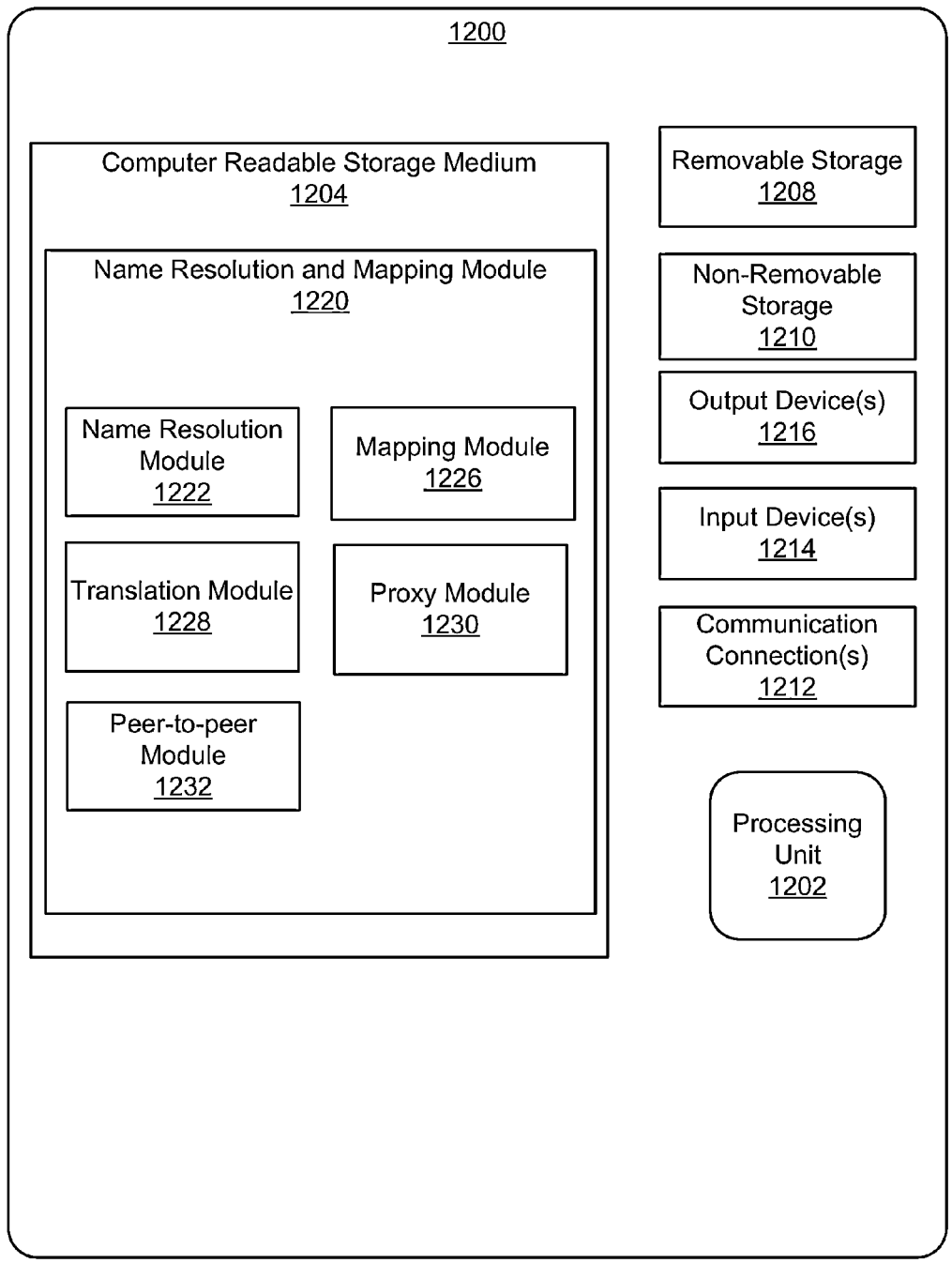
FIG. 12 shows a block diagram of an exemplary computer system in accordance with some embodiments.

Referring now to FIG. 12, a block diagram of an exemplary computer system in accordance with some embodiments is shown. With reference to FIG. 12, an exemplary system module for implementing embodiments disclosed above, such as the embodiments described in FIGS. 1-11. In some embodiments, the system includes a general purpose computing system environment, such as computing system environment 1200. The computing system environment 1200 may include, but is not limited to, servers, desktop computers, laptops, tablets, mobile devices, and smartphones. In its most basic configuration, the computing system environment 1200 typically includes at least one processing unit 1202 and computer readable storage medium 1204. Depending on the exact configuration and type of computing system environment, computer readable storage medium 1204 may be volatile (such as RAM), non-volatile (such as ROM, flash memory, etc.) or some combination of the two. Portions of computer readable storage medium 1204 when executed may perform name resolution and mapping functions to allow internal or private networks to use network addresses outside of private or internal network address ranges as specified by a network protocol.

Additionally in various embodiments, the computing system environment 1200 may also have other features/functionality. For example, the computing system environment 1200 may also include additional storage (removable and/or non-removable) including, but not limited to, magnetic or optical disks or tape. Such additional storage is illustrated by removable storage 1208 and non-removable storage 1210. Computer storage media includes volatile and nonvolatile, removable and non-removable media implemented in any method or technology for storage of information such as computer readable instructions, data structures, program modules or other data. Computer readable medium 1204, removable storage 1208 and nonremovable storage 1210 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by the computing system environment 1200. Any such computer storage media may be part of the computing system environment 1200.

In some embodiments, the computing system environment 1200 may also contain communications connection(s) 1212 that allow it to communicate with other devices. Communications connection(s) 1212 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Communications connection(s) 1212 may allow the computing system environment 1200 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that the communication connection(s) 1212 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, the computing system environment 1200 may also have input device(s) 1214 such as keyboard, mouse, a terminal or terminal emulator (either directly connected or remotely accessible via telnet, SSH, HTTP, SSL, etc.), pen, voice input device, touch input device, remote control, etc. Output device(s) 1216 such as a display, a terminal or terminal emulator (either directly connected or remotely accessible via telnet, SSH, HTTP, SSL, etc.), speakers, LEDs, etc. may also be included.

In some embodiments, the computer readable storage medium 1204 includes a name resolution and mapping module 1220. The name resolution and mapping module 1220 is configured for name resolution and mapping functions to allow internal or private networks to use network addresses outside of the private or internal network address ranges as specified by a network protocol. The name resolution and mapping module 1220 includes a name resolution module 1222, a mapping module 1226, a translation module 1228, a proxy module 1230, and a peer-to-peer module 1232.

In some embodiments, the modules may be distributed across one or more devices, including gateways, routers, name resolution devices, domain name servers, proxy devices, etc. In some embodiments, the modules may be executed, performed, etc., by a single device.

The name resolution module 1222 is configured for processing a request to resolve a symbolic name associated with a network address of a computing device. In some embodiments, the name resolution module 1222 may include DNS functionality, DHCP functionality, etc. The mapping module 1226 is configured for determining a mapping of a local network address associated with the computing device and an external network address associated with the computing device based on the symbolic name. In some embodiments, the local network address is outside a private IPv4 address range. In some embodiments, the network address of the computing device is in a global IPv4 address space.

The translation module 1228 is configured to process requests based on the mapping determined by the mapping module. In some embodiments, the translation module 1228 includes network address translation (NAT) functionality. The proxy module 1230 is configured to process a request from a local address space outside of a private IPv4 address space for an IPv4 address space. The peer-to-peer module 1232 is configured to process a request from a first local address space outside of a private IPv4 address space for a second local address space outside of a private IPv4 address space.

Figure 13:
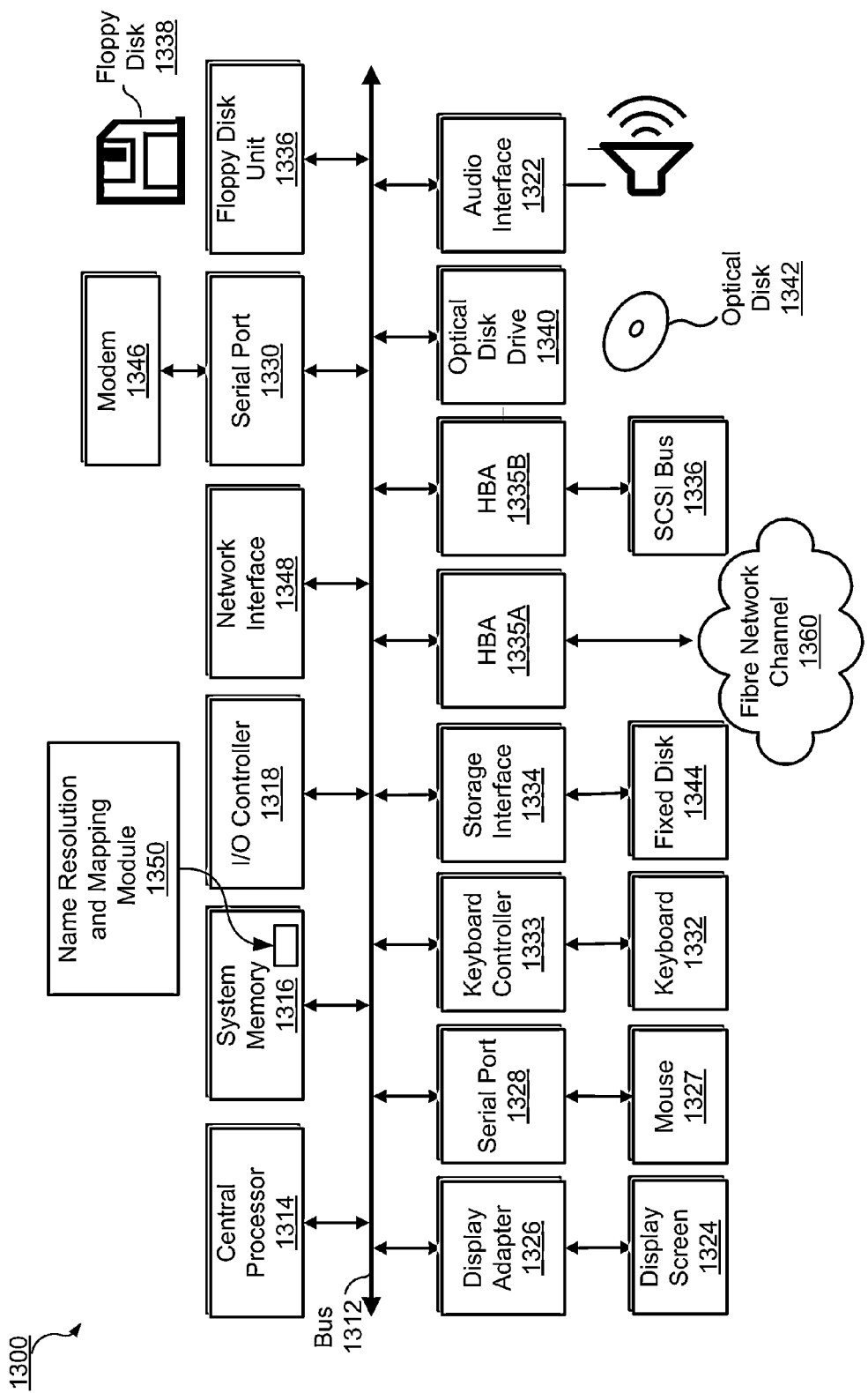
FIG. 13 shows a block diagram of another exemplary computer system in accordance with some embodiments.

Referring now to FIG. 13, a block diagram of another exemplary computer system in accordance with some embodiments is shown. FIG. 13 depicts a block diagram of a computer system 1300 suitable for implementing the present disclosure. Computer system 1300 includes a bus 1312 which connects the major subsystems of the computer system 1300, such as a central processor 1314, a system memory 1316 (typically RAM, but which may also include ROM, flash RAM, or the like), an input/output controller 1318, an external audio device, such as a speaker system 1320 via an audio output interface 1322, an external device, such as a display screen 1324 via a display adapter 1326, serial ports 1328 and 1330, a keyboard 1332 (interfaced with a keyboard controller 1333), a storage interface 1334, a floppy disk drive 1336 operative to receive a floppy disk 1338, a host bus adapter (HBA) interface card 1335A operative to connect with a Fibre Channel network 1360, a host bus adapter (HBA) interface card 1335B operative to connect to a Small Computer System Interface (SCSI) bus 1336, and an optical disk drive 1340 operative to receive an optical disk 1342. Also included are a mouse 1327 (or other point-and-click device, coupled to bus 1312 via serial port 1328), a modem 1346 (coupled to bus 1312 via serial port 1330), and a network interface 1348 (coupled directly to bus 1312).

It is appreciated that the network interface 1348 may include one or more Ethernet ports, wireless local area network (WLAN) interfaces, etc., but is not limited thereto. System memory 1316 includes a name resolution and mapping module 1350, which is configured for name resolution and mapping to allow internal or private networks to use network addresses outside of private or internal network address ranges specified by a network protocol. According to some embodiments, the name resolution and mapping module 1350 may include other modules for carrying out various tasks (e.g., modules of FIG. 12). It is appreciated that the name resolution and mapping module 1350 may be located anywhere in the system and is not limited to the system memory 1316. As such, residing within the system memory 1316 is merely exemplary and not intended to limit the scope of the embodiments. For example, parts of the name resolution and mapping module 1350 may be located within the central processor 1314 and/or the network interface 1348 but are not limited thereto.

The bus 1312 allows data communication between the central processor 1314 and the system memory 1316, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 1300 are generally stored on and accessed via a computer readable medium, such as a hard disk drive (e.g., fixed disk 1344), an optical drive (e.g., optical drive 1340), a floppy disk unit 1336, or other storage medium. Additionally, applications can be in the form of electronic signals modulated in accordance with the application and data communication technology when accessed via network modem 1346 or network interface 1348.

The storage interface 1334, as with the other storage interfaces of computer system 1300, can connect to a standard computer readable medium for storage and/or retrieval of information, such as a fixed disk drive 1344. A fixed disk drive 1344 may be a part of computer system 1300 or may be separate and accessed through other interface systems. The network interface 1348 may provide multiple connections to networked devices. Furthermore, a modem 1346 may provide a direct connection to a remote server via a telephone link or to the Internet via an Internet service provider (ISP). The network interface 1348 provides one or more connections to a data network, which may consist of any number of other network-connected devices. The network interface 1348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, not all of the devices shown in FIG. 13 need to be present to practice the present disclosure. The devices and subsystems can be interconnected in different ways than shown in FIG. 13. Code to implement the present disclosure can be stored in computer-readable storage media such as one or more of system memory 1316, fixed disk 1344, optical disk 1342, or floppy disk 1338. The operating system provided on computer system 1300 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings.

What is claimed is:

1. A computer-implemented method comprising executing on a device the steps of:

sending a communication from a first device to an address resolution and mapping system requesting an address for a second device, wherein the address resolution and mapping system is configured to establish a communications link between the first device addressable within a first network and a second device addressable within a second network, wherein the first network and the second network are communicatively linked by the address resolution and mapping system that is addressable within the first network and addressable within the second network;

resolving with the address resolution and mapping system a resolved address in the second network for the second device;

allocating with the address resolution and mapping system a first mappable address within the first network;

creating with the address resolution and mapping system a first mapping between the first mappable address and the resolved address;

responding with the address resolution and mapping system to the first device with the first mappable address;

allocating with the address resolution and mapping system a second mappable address within the second network; and creating with the address resolution and mapping system a second mapping between the second mappable address and an address of the first device in the first network;

wherein communications on the first network from the first device to the second device are addressed from the address of the first device to the first mappable address and wherein communications on the second network from the second device to the first device are addressed from an address of the second device to the second mappable address.

2. The method as described in claim 1, wherein the first network and the second network both and separately each comprise a complete network address range, each encompassing all possible network addresses in that range.

3. The method as described in claim 1, wherein the address resolution and mapping system comprises a routing system and a domain address resolution system communicatively linked to jointly handle creating and executing address mappings.

4. The method as described in claim 1, wherein the first address and the second address fall within the same network range but are disambiguated via the intervention of the address resolution and mapping system.

5. The method as described in claim 4, wherein the function of the address resolution and mapping system is transparent to the device associated with the first address and to the device associated with the second address.

6. The method as described in claim 1, wherein the address resolution and mapping 15 system includes a Domain Name System (DNS) resolver.

7. The method as described in claim 1, wherein the first network and the second network are complete Internet Protocol version 4 (IPv4) address ranges.

8. The method as described in claim 1, wherein the first address falls outside of an RFC1918 private address range.

9. The method described in claim 1, wherein the second mappable address falls within a RIR allocated address range.

10. The method described in claim 1, wherein a mapping may be statically or dynamically allocated.

11. The method described in claim 1, wherein the address resolution and mapping system contains a proxy capable of modifying addresses embedded inside of network communications according to the mapped addresses allocated for that communication.

12. The method described in claim 1, wherein an anchored network address is used to allow inbound communication to the first address.

13. The method described in claim 1, wherein peer-to-peer communication is facilitated by multiple address resolution and mapping systems.

14. The method described in claim 1, wherein a single address is used as the second mappable address.

15. The method described in claim 1, wherein the second address is external to a private address space in the first network.

16. A system comprising:
  a first device configured for sending a communication requesting an address for a second device; and
  an address resolution mapping system configured to receive the communication sent from the first device;
  wherein the address resolution and mapping system is configured to establish a communications link between the first device addressable within a first network and a second device addressable within a second network;
  wherein the first network and the second network are communicatively linked by the address resolution and mapping system that is addressable within the first network and addressable within the second network;
  wherein the address resolution and mapping system is further configured to resolve a resolved address in the second network for the second device;
  wherein the address resolution and mapping system is further configured to allocate a first mappable address within the first network;
  wherein the address resolution and mapping system is further configured to create a first mapping between the first mappable address and the resolved address;
  wherein the address resolution and mapping system is further configured to respond to the first device with the first mappable address;
  wherein the address resolution and mapping system is further configured to allocate a second mappable address within the second network;
  wherein the address resolution and mapping system is further configured to create a second mapping between the second mappable address and an address of the first device in the first network;
  wherein communications on the first network from the first device to the second device are addressed from the address of the first device to the first mappable address and wherein communications on the second network from the second device to the first device are addressed from an address of the second device to the second mappable address.

17. The system of claim 16, wherein the first network and the second network both and separately each comprise a complete network address range, each encompassing all possible network addresses in that range.

18. The system of claim 16, wherein the address resolution and mapping system comprises a routing system and an domain address resolution system communicatively linked to jointly handle creating and executing address mappings.

19. The system of claim 16, wherein the first address and the second address fall within the same network range but are disambiguated via the intervention of the address resolution and mapping system.

20. The system of claim 16, wherein the function of the address resolution and mapping system is transparent to the device associated with the first address and to the device associated with the second address further comprising:
  a peer-to-peer module configured to process a request from a first local address space outside of a private IPv4 address space for a second local address space outside of a private IPv4 address space.

21. The system of claim 16, wherein the address resolution and mapping 15 system includes a Domain Name System (DNS) resolver.

* * * * *